US005632788A

United States Patent [19]

Rabren

[11] Patent Number: 5,632,788

[45] Date of Patent: May 27, 1997

[54] HIGH POROSITY CALCIUM SILICATE MASS FOR STORING ACETYLENE GAS

[75] Inventor: Michael S. Rabren, Citronelle, Ala.

[73] Assignee: Worthington Acetylene Cylinder, Inc., Citronelle, Ala.

[21] Appl. No.: 381,356

[22] Filed: Jan. 31, 1995

[51] Int. Cl.[6] .................. F17B 1/00; F17B 1/18; B01J 21/16

[52] U.S. Cl. .................. 48/174; 48/179; 206/0.7; 502/80; 502/413; 141/4

[58] Field of Search .................. 206/0.7, 704; 220/88.1; 502/407, 413; 501/80; 141/4; 48/174, 179

[56] References Cited

U.S. PATENT DOCUMENTS

| | | | |
|---|---|---|---|
| 980,158 | 12/1910 | Kaiser | 206/0.7 |
| 1,419,746 | 6/1922 | Metzger | 206/0.7 |
| 2,883,040 | 4/1959 | Pater et al. | |
| 2,944,911 | 7/1960 | Muller | 106/704 |
| 3,454,362 | 7/1969 | Spry | 23/209.1 |
| 3,794,505 | 2/1974 | Heiser et al. | |
| 3,816,149 | 6/1974 | Zettel | |
| 3,895,096 | 7/1975 | Helser et al. | |
| 3,902,913 | 9/1975 | Heiser et al. | |
| 3,909,345 | 9/1975 | Parker et al. | |
| 4,129,450 | 12/1978 | Flanigen et al. | |
| 4,238,240 | 12/1980 | Krijgsman | |
| 4,349,463 | 9/1982 | Flanigen | |
| 4,402,892 | 9/1983 | Helser | |
| 4,451,332 | 5/1984 | Annergren et al. | |
| 4,467,040 | 8/1984 | Bruni et al. | |
| 4,467,041 | 8/1984 | Bruni et al. | |
| 4,721,698 | 1/1988 | Bruni et al. | |
| 4,765,458 | 8/1988 | Flanigen | |
| 4,800,930 | 1/1989 | Rabren | |
| 4,895,825 | 1/1990 | Deck et al. | |
| 4,970,246 | 11/1990 | O'Neal et al. | 524/5 |
| 5,035,774 | 7/1991 | Rabren | |

*Primary Examiner*—Nina Bhat
*Attorney, Agent, or Firm*—Fay, Sharpe, Beall, Fagan, Minnich & McKee

[57] ABSTRACT

A hardened asbestos-free, porous, calcium silicate filler material for an acetylene storage vessel is made by mixing quicklime with water to form a first mixture and at the same time mixing water, synthetic silica, cellulose fibers and ground quartz silica to form a second mixture. The first mixture is then added to the second mixture to form a third mixture. The third mixture is homogenized. Then a suspending agent is dispersed in the third mixture to form a fourth mixture. The fourth mixture is transferred into a cylinder to be filled and is cured under saturation steam pressure. Thereafter, the cylinder is dried. A gas storage cylinder so formed has a monolithic dry mass filling a metal shell. The mass has a porosity of about 88 to 91% and a density in the range of 250 g/l to 270 g/l.

19 Claims, 1 Drawing Sheet

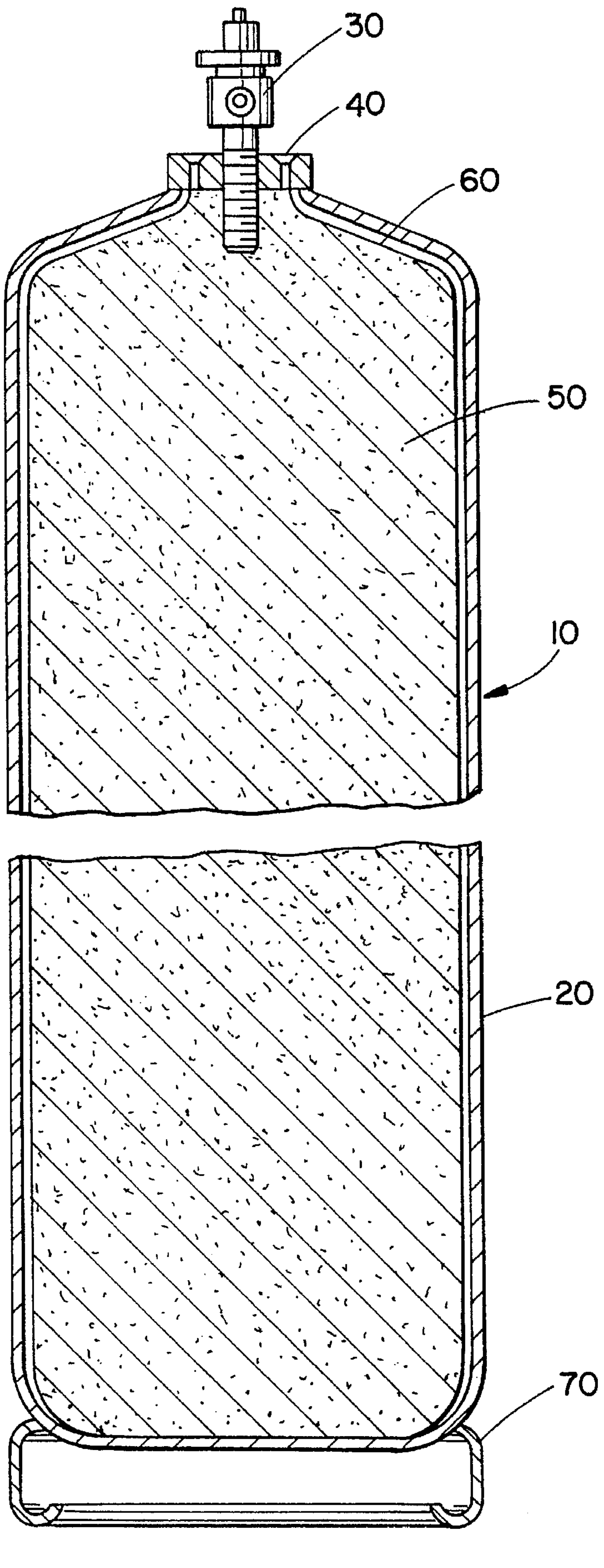
30
40
60
50
10
20
70

HIGH POROSITY CALCIUM SILICATE MASS FOR STORING ACETYLENE GAS

BACKGROUND OF THE INVENTION

This invention relates to a porous calcium silicate filler material. More particularly, the invention relates to acetylene gas storage vessels having an asbestos-free calcium silicate filler material therein and a method for manufacturing same.

Acetylene is widely used in oxy-acetylene torches because it enables temperatures of up to 3500° C. to be reached for the welding and cutting of metals. However, acetylene gas is difficult to store because it is unstable and can decompose to its elements, carbon and hydrogen, with explosive violence at pressures greater than about 2 atmospheres if not properly stabilized. To provide for safe storage of acetylene gas, the gas must be dissolved in a solvent. Acetylene gas is thus typically stored in the form of an acetylene gas solution dissolved in, for example, an acetone solvent, in a vessel containing a porous filler mass. The storage vessel may be a steel cylinder. In this way, acetylene can be safely stored and shipped under pressures of up to about 15 atmospheres.

The porous filler mass comprises a capillary system of interconnecting micropores. Typically the porous filler mass is a hardened calcium silicate mass having a porosity of about 90%. The calcium silicate mass allows sufficient surface area to aid in maximum contact between the solvent and the acetylene. This system will absorb acetylene at a rate approaching 0.58 lbs. of acetylene per pound of the solvent.

The acetylene-containing cylinders are produced by filling the cylinder with the porous filler mass and injecting the solvent into the cylinder. Acetylene is then introduced into the cylinder and is distributed throughout the capillary system of the porous material as a result of its dissolution in the solvent. In this way, it is possible to insure safe storage of dissolved acetylene in quantities of up to eight times the volume of the gas which could be stored without the porous mass/solvent system.

The calcium silicate storage mass is made by mixing quicklime (calcium oxide) into water to form an aqueous slurry. Ground quartz silica is added to the slurry. A reinforcing agent is added during the mixing step to help create and hold a homogenous solution to insure a uniform mass throughout the cylinder after curing and drying. Traditionally, asbestos fibers have been used for this purpose. During mixing, one or more agents can be added to insure that the mass remains monolithic before the crystalline structure is formed during curing.

The solids are mixed in an aqueous solution for certain mixing times. The slurry is then pumped into cylinder shells completely filling them and is then cured, creating a crystalline calcium silicate mass in the cylinder. The mass is then dried to form a high porosity core, which allows the absorption of the solvent and the acetylene gas.

It is of great importance that the calcium silicate filler mass should be monolithic and should be substantially free of voids. Void spaces in the filler mass provide an available space for the formation of unacceptable volumes of acetylene gas with the attendant explosion risk. Thus, the filler mass must be formed with uniformly distributed very fine pores. During drying, the mass shrinkage must be kept controlled to less than 0.05% in any dimension but never to exceed 0.125 inches in a longitudinal direction inside the steel shell.

Previously, asbestos fibers were introduced into the aqueous slurry from which the calcium silicate filler mass was produced. The asbestos fibers functioned as a settling resistant or suspending agent to retard the settling or separation of the lime and silica from the water in the aqueous slurry composition prior to its hardening into the calcium silicate filler mass. In addition, in the hardened calcium silicate filler mass, the asbestos fibers acted as a reinforcing agent to help maintain the structural integrity of the filler mass.

However, asbestos fibers have now been found to pose health and pollution problems. Recent regulations by the Occupational Health and Safety Administration have made the use of asbestos much more difficult. OSHA regulations, particularly in 29 C.F.R. §1910 now state that an asbestos fiber level of just 0.1 fiber per cubic centimeter on an eight hour time weighted average is subject to regulation. In addition, the disposal of waste from the manufacturing phase of the calcium silicate storage mass makes it desirable to replace asbestos fibers with another more environmentally friendly product. Such constraints relating to health and safety conditions and to the handling of asbestos material have led to the consideration of other suspending and reinforcing agents in the calcium silicate filler mass.

One known substitute for asbestos fibers in the calcium silicate filler mass is an alkali resistant glass fiber. An acetylene storage vessel having a hardened asbestos free calcium silicate filler mass reinforced by glass fibers is disclosed in U.S. Pat. No. 4,349,463. While glass fibers are acceptable for this purpose, the cost of such alkali resistant glass fibers is rather high and glass fibers do not allow the filler mass to have the necessary compressibility because the glass fibers fracture even when only slightly compressed.

Therefore, others have tried to use organic suspending and reinforcing agents such as cellulose, together with mineral suspending agents. One known such calcium silicate filler mass is disclosed in U.S. Pat. No. 4,895,825. This mass includes cellulose reinforcing fibers, as well as a mineral suspending agent which can be either solid glass fibers or solids of purified clay. However, the cost for this filler material is still rather high. In addition, the mixing time of this material is long since it involves the steps of slaking quicklime with hot water to form a first mixture; adding additional water and stirring at a slow speed to form a second mixture; dispersing a cellulose reinforcing agent in the second mixture to form a third mixture; introducing with stirring into the third mixture a mixture of natural silica and either calcium silicate or amorphous ultrafine synthetic silica to form a fourth mixture and subsequently dispersing a second mineral suspending agent, which can be either glass fibers or purified clay, into the fifth mixture to form a sixth mixture. Only then is the sixth mixture transferred into the storage cylinder to be filled. Also, the step of slaking quicklime with hot water is hazardous as a volatile mixture is created.

Accordingly, it has been considered desirable to develop a new and improved calcium silicate storage mass and a method for manufacturing same, which would overcome the foregoing difficulties and others while providing better and more advantageous overall results.

BRIEF SUMMARY OF THE INVENTION

In accordance with the present invention, a new and improved process for filling a cylinder with a calcium silicate porous mass to produce an acetylene gas storage cylinder is provided.

More particularly, the process comprises the steps of mixing about 8–15% by wet weight quicklime with ambient temperature water to form a first mixture. A slurry containing the following ingredients is mixed in the following order to form a second mixture: ambient temperature water, about 0.002% to 0.010% by wet weight, synthetic silica, about 1.5% to 5% by wet weight, cellulose fibers and about 8% to 14% by wet weight ground quartz silica. The first mixture is added to the second mixture to form a third mixture. The third mixture is homogenized by stirring. A suspending agent is dispersed in the third mixture under a partial vacuum to form a fourth mixture. The suspending agent comprises about 0.002% to 0.010% by wet weight ethyl hydroxyethyl cellulose. The fourth mixture is then transferred under partial vacuum into a cylinder to be filled. The fourth mixture is cured under saturation steam pressure of about 145 psig for about 25 hours. The cylinder is then dried for about five days at a temperature of about 325° F.

If desired, the first mixing step can occur at approximately 1000 rpm, as can the second mixing step. The homogenizing step can, if desired, be performed by stirring at approximately 1000 rpm. If desired, the homogenizing step can be performed under a partial vacuum between about 10 inches and 18 inches Hg. Preferably, the dispersing step is performed under a partial vacuum of about 18 inches to 20 inches Hg. Also, the step of transferring can comprise, if desired, the subsidiary step of pumping the slurry at a vacuum of about 22 inches Hg.

According to another aspect of the present invention, a gas storage cylinder is provided for storing gases therein.

More particularly in accordance with this aspect of the invention, the storage cylinder comprises a metal shell and a monolithic dry mass filling the shell. The mass has a porosity of about 88% to 91% and a density range of about 250 g/l to 270 g/l. The mass constitutes a dry product of an aqueous paste consisting essentially of cellulose at about 1.5% to 5% total wet weight as a fibrous reinforcing agent, water, synthetic silica at about 0.002% to 0.01% total wet weight, quicklime at about 8% to 15% total wet weight, ground quartz silica at about 8% to 14% total wet weight and ethyl hydroxyethyl cellulose at about 0.02% to 0.010% total wet weight as an organic suspending agent. The water can be present in an amount of about 2.5 times greater than the amount of solids.

If desired, the cylinder can further comprise acetylene gas solution disposed in the mass. Also, a solvent can be disposed in the mass. Preferably, the solvent comprises acetone. If desired, the mass can have a crush strength between 250 and 500 psig. Preferably the mass has a porosity between 88.5% and 90.4%. Preferably the mass has a density between 257 g/l and 269 g/l.

One advantage of the present invention is the provision of a new and improved method for manufacturing a high porosity filler mass for storing acetylene gas in a compressed gas cylinder.

Another advantage of the present invention is the provision of a high porosity calcium silicate filler mass having only cellulose fibers which function as both the reinforcing agent and the suspending agent thereby reducing the cost of the filler mass.

Still another advantage of the present invention is the provision of a method for mixing a slurry to form a calcium silicate filler mass in which quicklime is slaked with ambient temperature water rather than hot water to reduce the mixing time of the mass and to increase operator safety.

Yet another advantage of the present invention is the provision of a method for manufacturing a high porosity calcium silicate filler mass in which only a single mixing speed is necessary for the mixing, homogenizing and disbursing steps. This reduces the equipment needed and the time needed to mix the slurry to form the filler mass.

An additional advantage of the present invention is the provision of a method for forming a calcium silicate mass in which the mixing time of the slurry is reduced by premixing the cellulose fiber, silica and synthetic silica in one vessel while slaking the quicklime in another vessel.

A further advantage of the present invention is the provision of a method for manufacturing a high porosity calcium silicate filler mass in which only a single reinforcing agent is used thereby reducing the mixing time needed to form the filler mass, as well as the cost thereof.

A yet further advantage of the present invention is the provision of a method of manufacturing a high porosity calcium silicate filler mass in which only a single suspending agent is used thereby reducing the mixing time needed to form the filler mass, as well as the cost thereof.

Still further advantages of the present invention will become apparent to those of ordinary skill in the art upon the reading and understanding of the following detailed description of the preferred embodiments.

BRIEF DESCRIPTION OF THE DRAWING

The single FIGURE of the drawing is a simplified schematic cross-sectional view of an acetylene storage vessel having an asbestos-free hardened porous calcium silicate filler mass reinforced with only cellulose fibers in accordance with the present invention.

DESCRIPTION OF THE PREFERRED EMBODIMENTS

In order to afford a complete understanding of the present invention and an appreciation of its advantages, a description of the preferred embodiments of the present invention is presented herein.

With reference to the single FIGURE of the drawing, an acetylene storage vessel 10 comprises a metal shell 20 typically having a cylindrical shape forming an enclosed volume. The acetylene storage vessel is also typically provided with a valve 30 and fuse plugs 40. A hardened monolithic porous calcium silicate filler mass 50 is disposed in and substantially fills the enclosed volume of the shell 20 for receiving a dissolved acetylene gas solution.

It is known in the art that a small clearance space 60 is desirable, although not required, between the upper end of the cylinder shell and the filler mass 30. Such clearance space assists in charging the cylinder with a dissolved acetylene gas solution and in the release of acetylene gas from the solution disposed in the porous calcium silicate filler mass 50. However, this clearance space can be no greater than 0.05% of any cylinder shell dimension and not greater than 0.125 inches in a longitudinal direction inside the cylinder 20. Excessive clearance must be avoided due to safety considerations. An excessively large clearance space would provide unsafe storage of the acetylene because free acetylene gas could form in these locations and explode. The space 60 is shown as being larger only for the sake of comprehension.

The vessel 10 is also provided with a foot ring 70 in order to stabilize the shell 20 in an upright position.

The method according to the present invention involves simultaneously mixing two separate mixtures in two mixing vessels. Quicklime is added to water at ambient temperature to form a first mixture which is allowed to slake. At the same time, a second mixture is formed by mixing water and cellulose with an ultrafine synthetic silica and ground quartz silica. Once slaked, the first mixture is transferred to the second mixer in which the slurry of the cellulose, synthetic silica and silica have already been mixed with water thereby forming a third mixture.

After the third mixture has been mixed for a predetermined time, a suspending agent is added to insure that the solids stay suspended before curing thereby forming a fourth mixture, which is further mixed. The suspending agent can be ethyl hydroxyethyl cellulose. One such material is sold under the mark Bermocoll by Berol Nobel of Newark, N.J. This product is commonly used in similar applications for a variety of products unrelated to this invention.

In accordance with the present invention, cellulose fibers have been found, after mixing at certain levels, to form a sufficient reinforcement in a calcium silicate mass to allow proper size and distribution of the pores to achieve a porosity of up to 91% and a strength of up to 500 psig in the resulting mass. Cellulose fibers have been shown to be the most effective at a level of about 1.5% to 5% to total wet weight. As is known, the cellulose is at least partially delignified, either chemically or mechanically, or both.

The ground quartz silica used has an average particle size diameter of 8.5 microns and a specific surface area of 3041 $cm^2/g$. The ultrafine synthetic silica has a surface area of $200\pm30$ $m^2/g$.

Quicklime addition is in amounts proportional to the amount of silica. Therefore, the amount of quicklime will vary between about 8% to about 15% total wet weight with ground quartz silica ranging from about 8% to 14% total wet weight. Synthetic silica is used in much smaller amounts of about 0.002% to 0.010% to total wet weight. The ethyl hydroxyethyl cellulose suspending agent is used in amounts of about 0.002% to 0.010% total wet weight. The balance of the formula is water which is distributed to the first mixing vessel for the quicklime, and the second mixing vessel for the synthetic silica, cellulose and quartz silica. Therefore, the water is present in the mixture in an amount of about 2.5 times greater than the amount of solids.

After drying, examination shows that the mass completely fills the cylinder. Shrinkage is less than 0.05%. Most typically, the actual shrinkage approaches only 0.0625 inches in a longitudinal direction and less than 0.025 inches latitudinally in the cylinder. The density of the dry mass has been found to be between 245 g/l to 285 g/l. A crush strength between 250 psig and 500 psig is also typical. It is estimated that a minimum of 35% by weight of the hardened porous calcium silicate filler mass is in a crystalline phase to minimize shrinkage.

With a porosity between 88% and 91%, the mass is very capable of holding acetylene gas safely in a solution of solvent, preferably acetone, as mentioned, within the mass.

The invention will now be illustrated by the following non-limiting examples:

EXAMPLE I

A total of 174 lbs. quicklime (small pebble 95% CaO from Chemline in Dallas, Tex.) was mixed with 66.5 gallons of ambient temperature water in a first mixing vessel at 1000 rpm for 30 minutes. While the quicklime was slaking, the following ingredients were added in a second mixing vessel in the following order: 63 gallons of ambient temperature water, 158 lbs. of quartz silica (Grade 106 Silcosil from U.S. Silica Co. of Pittsburgh, Pa.), 34.6 lbs. of cellulose fibers (Brunswick softwood filter pulp from Georgia Pacific of Charlotte, N.C.) and 6 lbs. of synthetic silica (HDK-N20 from Wacker Silicones of Adrain, Mich.). This mixture was agitated for 5 minutes at 1000 rpm to form a slurry.

While it has been indicated in the previous paragraph that the water, quartz silica, cellulose fibers and synthetic silica were mixed in that order, it is only necessary that the synthetic silica be added last to the mixture. If the synthetic silica were not the last ingredient added to the mixture, then the solution would become too viscous to mix any further. Thus, if desired, the cellulose fibers could be added to the water before the quartz silica.

After the quicklime has been mixed for 30 minutes, it was transferred into the second mixing vessel containing the water, cellulose fibers, silica and synthetic silica. The resulting slurry was mixed at 1000 rpm for 15 minutes under a vacuum of 18 inches of mercury. Then, while the slurry continued to be mixed, 5.5 lbs. of ethyl hydroxyethyl cellulose (Bermocoll E4116 from Berol Nobel of Newark, N.J.) was added and mixed for an additional 10 minutes at 1000 rpm, again under a partial vacuum of 18 inches Hg.

The monolithic slurry was pumped into a cylinder shell under 22 inches Hg vacuum. The resulting mass in the cylinder was cured for approximately 25 hours at 145 psig saturated steam. It was then dried for 5 days at 325° F.

The physical properties of the resulting porous calcium silicate filler mass showed a porosity of 88.5%, a shrinkage of 0.025% both longitudinally and latitudinally and a density of 269 g/l.

EXAMPLE II

A total of 168 lbs. quicklime was mixed with 80 gallons of ambient temperature water for 20 minutes at 1000 rpm in a first mixing vessel. While the quicklime was slaking, the following ingredients were added to a second mixing vessel in the order listed: 74.5 gallons of ambient temperature water, 156 lbs. of quartz silica, 40 lbs. of cellulose fibers and 156 lbs. of quartz silica. This mixture was agitated for 5 minutes at 1000 rpm to form a slurry. After the quicklime has slaked, it was transferred into the second mixing vessel containing the water, cellulose fibers, silica and synthetic silica.

The resulting slurry was mixed for 15 minutes at 1000 rpm under a vacuum of about 10 inches Hg. While the slurry continued mixing at 1000 rpm, 8 lbs. of ethyl hydroxyethyl cellulose was added. After a further 10 minutes of mixing at 1000 rpm, the mixing was stopped and the resulting slurry was pumped into empty cylinder shells. Curing and drying took place as in Example I.

The physical properties of the resulting porous calcium silicate filler mass indicated a porosity of 90.5%, a shrinkage of 0.05% both longitudinally and latitudinally and a density of 251 g/l.

EXAMPLE III

A total of 156 lbs. quicklime was mixed in a first mixing vessel with 75 gallons of ambient temperature water at 1000 rpm for 30 minutes. While the quicklime was slaking, a second mixing vessel had the following ingredients added to it in the order listed: 71 gallons of ambient temperature water, 141 lbs. of quartz silica, 36 lbs. of cellulose fibers and 7 lbs. of synthetic silica. This mixture was agitated for 5 minutes at 1000 rpm to form a slurry. After the quicklime had been mixed for 30 minutes, it was transferred into the second mixing vessel containing the water, cellulose fibers, silica and synthetic silica.

The resulting slurry was mixed at 1000 rpm for 20 minutes under a partial vacuum of 18 inches Hg. Then, as the mixing continued, 6.75 lbs. of ethyl hydroxyethyl cellulose was added under a partial vacuum of 20 inches Hg. Mixing continued for an additional 15 minutes. Cylinder shells were then filled with the resultant slurry. These cylinders were cured and dried as in Example I.

The physical properties of the resultant porous calcium silicate mass indicated a porosity of 89.5%, a shrinkage of less than 0.05% both longitudinally and latitudinally and a density of 259 g/l.

The cylinders so manufactured have successfully passed the Compressed Gas Cylinders Association bonfire test, flashback test and two mechanical strength tests, namely, a mechanical strength of filler test and an impact stability test. The tests are described in detail in pamphlet No. C-12 of the Compressed Gas Cylinders Association. These tests have been incorporated into the Department of Transportation's regulations listed in 49 C.F.R. and entitled "Qualifications Procedure for Acetylene Cylinder Design."

Briefly, the proof of the mechanical strength of the filler test involved subjecting the cylinders filled with the porous calcium silicate mass according to the present invention to 5000 drops at 3 inches. In all cases, the filler did not exceed a 0.0625 inch vertical drop. This passes the test.

The flashback test involved subjecting full cylinders having the porous calcium silicate filler mass according to the present invention to an internal flash. In all cases, the porous calcium silicate mass absorbed the energy without failure to the cylinder.

The fire test involved subjecting full cylinders employing a calcium silicate filler mass according to the present invention to a chimney fire. In all cases, the cylinder did not rupture and acetylene was vented by the fuse plugs.

Finally, the impact stability test involved denting full cylinders employing a calcium silicate filler mass according to the present invention to over ¼ of the diameter of the cylinder. This resulted in no failure to either the shell or the mass.

In addition to passing the foregoing described tests, an acetylene storage vessel having a calcium silicate filler mass reinforced with only cellulose fibers according to the present invention exhibits satisfactory acetylene gas discharge characteristics.

The invention has been described with reference to preferred embodiments. Obviously, modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A process for producing a gas storage cylinder, said process comprising the steps of:

mixing about 8% to 15% by wet weight quicklime with ambient temperature water to form a first mixture;

mixing a slurry containing the following ingredients: ambient temperature water, about 0.002% to 0.010% by wet weight synthetic silica, about 1.5% to 5% by wet weight cellulose fibers and about 8% to 14% by wet weight ground quartz silica to form a second mixture;

adding the first mixture to the second mixture to form a third mixture;

homogenizing the third mixture by stirring;

dispersing a suspending agent in said third mixture to form a fourth mixture, said suspending agent comprising about 0.002% to 0.010% by wet weight ethyl hydroxyethyl cellulose;

transferring said fourth mixture into a cylinder to be filled;

curing said fourth mixture under saturation steam pressure of about 145 psig for about 25 hours; and, drying said cylinder for about five days at a temperature of about 325° F. to fill said cylinder with a porous calcium silicate mass consisting essentially of cellulose at about 1.5% to 5% total wet weight as a fibrous reenforcing agent; water; ground quartz silica at about 8% to 14% total wet weight; quicklime at about 8% to 15% total wet weight; synthetic silica at about 0.002% to 0.01% total wet weight: and, ethyl hydroxyethyl cellulose at about 0.002% to 0.010% total wet weight as an organic suspending agent, the water being present in an amount of about 2.5 times greater than the amount of solids.

2. The method of claim 1 wherein said first mixing step occurs at approximately 1000 rpm.

3. The method of claim 1 wherein said second mixing step occurs at approximately 1000 rpm.

4. The method of claim 1 wherein said homogenizing step is performed by stirring at approximately 1000 rpm.

5. The method of claim 1 wherein said homogenizing step is performed under a partial vacuum at between about 10 inches Hg and 18 inches Hg.

6. The method of claim 1 wherein said dispersing step is performed under a partial vacuum at between about 18 inches Hg and 20 inches Hg.

7. The method of claim 1 wherein said step of transferring is performed under a partial vacuum of about 22 inches Hg.

8. A gas storage cylinder for storing gases therein, comprising:

a metal shell; and, a monolithic dry mass filling said shell, said mass having a porosity of about 88% to 91% and a density range of about 250 g/l to 270 g/l and constituting a dried product of an aqueous paste consisting essentially of:

cellulose at about 1.5% to 5% total wet weight as a fibrous reenforcing agent, water, synthetic silica at about 0.002% to 0.01% total wet weight, quicklime at about 8% to 15% total wet weight, ground quartz silica at about 8% to 14% total wet weight, and ethyl hydroxyethyl cellulose at about 0.002% to 0.010% total wet weight as an organic suspending agent, the water being present in an amount of about 2.5 times greater than the amount of solids.

9. The cylinder of claim 8 further comprising a dissolved acetylene gas solution disposed in said mass.

10. The cylinder of claim 9 further comprising a solvent disposed in said mass.

11. The cylinder of claim 10 wherein said solvent comprises acetone.

12. The cylinder of claim 8 wherein said mass has a crush strength between 250 and 500 psig.

13. The cylinder of claim 8 wherein said mass has a porosity between 88.5% and 90.4%.

14. The cylinder of claim 8 wherein said mass has a density between 257 g/l and 269 g/l.

15. A filler mass for storing a gas therein, comprising:

a monolithic dry mass, said mass having a porosity of about 88% to 91% and a density range of about 250 g/l to 270 g/l and constituting a dried product of an aqueous paste consisting essentially of:

cellulose at about 1.5% to 5% total wet weight as a fibrous reenforcing agent, water, ground quartz silica at about 8% to 14% total wet weight, quicklime at about 8% to 15% total wet weight, synthetic silica at about 0.002% to 0.01% total wet weight, and the water being present in an amount of about 2.5 times greater than the amount of solids.

16. The filler mass of claim 15 wherein said mass has a crush strength between 250 and 500 psig.

17. The filler mass of claim 15 wherein said mass has a porosity between 88.5% and 90.4%.

18. The filler mass of claim 15 wherein said mass has a density between 257 g/l and 269 g/l.

19. A process for producing a gas storage cylinder, said process comprising the steps of:

providing a cylinder to be filled; and, filling said cylinder with a porous calcium silicate mass consisting essentially of cellulose at about 1.5% to 5% total wet weight as a fibrous reenforcing agent; water; ground quartz silica at about 8% to 14% total wet weight; quicklime at about 8% to 15% total wet weight; synthetic silica at about 0.002% to 0.01% total wet weight; and, the water being present in an amount of about 2.5 times greater than the amount of solids.

* * * * *